No. 786,082. PATENTED MAR. 28, 1905.
A. WULTZE.
PROCESS OF COLORING NATURAL COMPACT CRYSTALLINE STONES.
APPLICATION FILED FEB. 25, 1903.
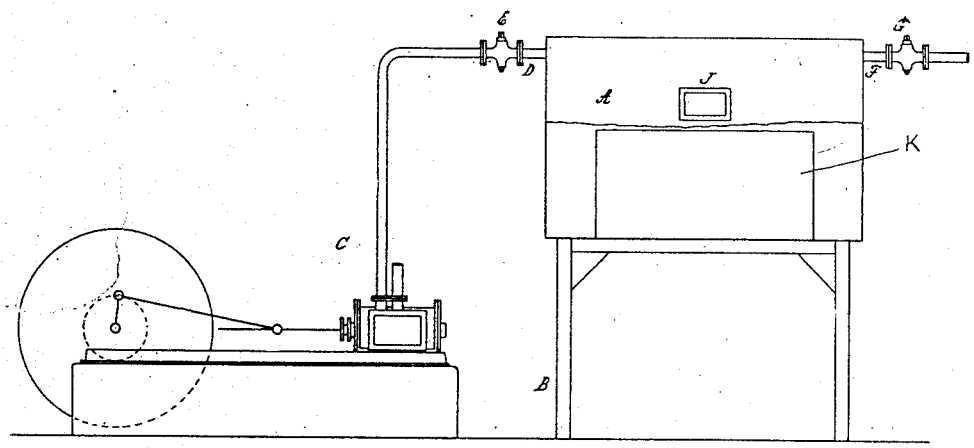

No. 786,082.                                                                      Patented March 28, 1905.

UNITED STATES PATENT OFFICE.

ADOLPH WULTZE, OF CHARLOTTENBURG, GERMANY, ASSIGNOR TO THE FIRM OF CHEMISCH-TECHNISCHE FABRIK, DR. ALB. R. W. BRAUD & CO., G. M. B. H., OF CHARLOTTENBURG, GERMANY.

PROCESS OF COLORING NATURAL COMPACT CRYSTALLINE STONES.

SPECIFICATION forming part of Letters Patent No. 786,082, dated March 28, 1905.

Application filed February 25, 1903. Serial No. 145,010.

*To all whom it may concern:*

Be it known that I, ADOLPH WULTZE, doctor of philosophy, a subject of the King of Prussia, German Emperor, residing at 8 Salzufer, Charlottenburg, Kingdom of Prussia, German Empire, have invented new and useful Improvements in Processes of Coloring Natural Compact Crystalline Stone, of which the following is a specification.

This invention relates to the process of coloring natural compact crystalline stone by means of depositing or precipitating coloring substances in the interior of the stone, and has for its object to color the stone throughout the interior. Hitherto only the surface of the stone has been colored and the interior has remained uncolored.

My invention is more especially adapted for coloring marble. It may, however, also be used for coloring like natural crystalline compact stone, such as granite, flint, &c.

The accompanying drawing illustrates an apparatus for carrying out my process in vertical section, partly in front elevation.

A is a suitable vessel or chamber, of copper or other suitable material, capable of being exhausted. B represents supports for said vessel.

C is an exhaust-pump connected with chamber A by means of a pipe D. The pipe D has a cock E, by means of which communication between pump C and chamber A may be closed.

F is a pipe provided with a cock G, by which the chamber A may be closed or may be connected with the atmosphere.

J is a sight-opening closed by a glass plate in the wall of the vessel A.

K is the stone to be colored.

My process is based on the discovery, hitherto unknown, that although natural crystalline compact stone—as, for instance, marble, granite, and such like—is apparently very compact and without any pores nevertheless a relatively large amount of air is inclosed in the interior of the stone. In processes of coloring stone the said air acts like a cushion and prevents coloring liquids from entering into the interior of the stone.

My process consists in the following steps: First, the stone to be colored is gently heated in order to expel any water absorbed therein; secondly, the stone is placed into a liquid containing a suitable coloring-matter; thirdly, the air inclosed in the stone is exhausted, which may be effected by subjecting the stone to the action of a suitable exhaust-pump; fourthly, the liquid containing a suitable coloring-matter is forced into the stone thus thoroughly freed from any inclosed air, and this may be effected by atmospheric or a suitable higher pressure; fifthly, the stone is removed from the liquid and dried, while the solvent is evaporated.

For carrying out my process I may proceed in the following manner: I heat a suitable block of marble and then place it into the chamber A, containing a suitable solution of a coal-tar dyestuff. The cock G being closed, I open the cock E and exhaust the air from the chamber A by means of the exhaust-pump C. By means of the sight-glass J the escape of the air from the stone is visible in the form of bubbles. When the evolution of the air-bubbles has ceased, indicating that the air has been driven practically completely from the stone, I close the cock D and connect the vessel A with the atmosphere by opening the cock G. The liquid present in the vessel A will be now forced by atmospheric pressure into the interior of the stone. Then I take the stone from the liquid and expel the solvent by heating, so that the coloring-matter will remain and color the stone thoroughly through its interior. If I wish to drive the liquid with a higher pressure than atmospheric pressure into the stone, I may reverse the operation of the exhaust-pump, so that it will work as a pressure-pump.

The skilled workman will choose the coloring-matter and the solvents for it suitable for the special desired purpose. I may use coal-tar dyestuffs—for instance, fuchsin dissolved in water or alcohol. I may use also natural dyestuffs—for instance, carmine. I may use inorganic colored substances—for instance, sulfate of copper. The skilled workman will choose the substances suitable for his special case according to the desired color, the shade, the solubility, the costs, &c. The concentration of the solutions will be chosen according to the shade desired. For preparing light shades I use diluted solutions, and for preparing dull shades I use concentrated solutions. I may also use solutions that will be decomposed by being heated or by evaporation of the solvent, and thus producing a precipitate. For instance, I may use a suitable solution of ammoniacal oxid of copper.

Instead of using a liquid containing a colored substance and producing the color by the same directly I may also use several liquids successively—for instance, two that react with each other to form a colored precipitate in the interior of the stone. I may proceed in the following way: I place the stone into an aqueous solution of a substance, exhaust the air, and force the solution into the stone by atmospheric or higher pressure. Then I evaporate the solvent by heating the stone after having been taken from the liquid. After this is done I place the stone into a second aqueous solution of a second substance that may react with the first substance present in the interior of the stone to give a colored precipitate. I may use for the first operation a suitable compound of lead—for instance, acetate of lead—and for the second operation a suitable chromate—for instance, chromate of potassium, or vice versa. I obtain in this manner yellow colors. I may obtain any other color by suitable combination of two or more substances. For instance, I may obtain green shades by using, first, copper acetate or sulfate and arsenic. A blue color may be obtained by potassium ferrocyanid and a ferric salt—for instance, ferric chlorid or ferric sulfate. I may also use several substances and alter in this way the shades. I may use, first, a solution of potassium ferrocyanid; secondly, a ferric salt; thirdly, a copper salt.

For forming colored precipitates in the interior of the stone I prefer to use solutions with different solvents, whereby I choose such a solvent that only the one substance introduced into the stone is dissolved and the other substance is not dissolved. At last I introduce a liquid that is able to dissolve both substances and cause them to react with each other. The manner of proceeding may be illustrated by the following example: I heat the stone, place it into the chamber containing an aqueous solution of chromate of potassium, exhaust the air from the stone, stop the pump, connect the vessel containing the stone and the liquid with the atmosphere and allow atmospheric pressure or a higher pressure to act on the stone and the liquid, whereby I force the aqueous solution of chromate of potassium into the stone. Then I evaporate the water of the absorbed solution by heating the stone. I may accelerate the evaporation by carrying out the heating in a vacuum. Now I place the stone impregnated with chromate of potassium into an alcohol solution of acetate of lead, subject the stone to the action of a vacuum-pump, stop the pump, connect the vessel containing the stone and the liquid with the atmosphere and force the alcoholic solution of acetate of lead into the interior. Then I take the stone from the solution or discharge the solution and evaporate the alcohol by heating the stone. I may, again, accelerate the evaporation by carrying out the heating in a vacuum. At last I place the stone into water, exhaust the air, reëstablish the atmospheric pressure and force water, using atmospheric or a higher pressure, into the stone. The water entering into the interior of the stone dissolves the chromate of potassium and acetate of lead and causes the two substances to react with each other. By using several solutions successively the solvents of each not acting to dissolve the color of the others and the solutions being of a character to react with each other to produce colored compounds and by evaporating the solvent after every operation and finally using a solvent for all the deposited coloring ingredients the resulting colored compound is made to penetrate very deeply into the interior of the block and is not deposited only in the parts near to the surface. I may produce very varying shades and colors in choosing the solvents and the dissolved substances suitable to the desired shades. For instance, I may use an aqueous solution of ferrocyanid of potassium, evaporate the water, then a solution of lead acetate in alcohol, and, finally, water. I may produce colored precipitates in the interior of the stone also with a single liquid if the substance of the block itself acts as precipitant on the substance of the liquid. If I use, for instance, a solution of chlorid of copper for impregnating a block of marble by my process, carbonate of copper will be precipitated in the interior. For avoiding a too sudden reaction I may choose solvents which prevent the reaction of the block with the liquid. The reaction then will only ensue after the solvent has been evaporated.

What I claim as my invention, and desire to secure by Letters Patent, is—

1. Process for coloring natural crystalline compact stones which consists in freeing the stone from air, forcing by pressure a solution of a suitable compound into the stone, evaporating the solvent, again freeing the stone from air, forcing by pressure a solution of a compound able to give colored precipitates with the substance firstly introduced into the stone and evaporating the solvent.

2. Process for coloring natural crystalline compact stones which consists in freeing the stone from air, forcing by pressure a solution of a compound able to give colored precipitates with the substance firstly introduced into the stone, the solvent of the secondly-introduced substance being unable to dissolve the substance firstly introduced, evaporating the solvent, freeing the stone from air and forcing by pressure a solvent able to dissolve both the substances introduced into the stone.

In witness whereof I have hereunto signed my name, this 11th day of February, 1903, in the presence of two subscribing witnesses.

ADOLPH WULTZE.

Witnesses:
 WOLDEMAR HAUPT,
 HENRY HASPER.